United States Patent [19]

Nicklin et al.

[11] 4,098,886
[45] Jul. 4, 1978

[54] GAS PURIFICATION LIQUORS

[75] Inventors: Thomas Nicklin, Bamford; Frederick Farrington, Stretford, both of England

[73] Assignee: British Gas Corporation, London, England

[21] Appl. No.: 769,213

[22] Filed: Feb. 16, 1977

Related U.S. Application Data

[63] Continuation of Ser. No. 667,212, Mar. 15, 1976, abandoned, which is a continuation of Ser. No. 414,275, Nov. 9, 1973, abandoned.

[30] Foreign Application Priority Data

| Nov. 10, 1972 [GB] | United Kingdom | 51970/72 |
| Nov. 30, 1972 [GB] | United Kingdom | 55393/72 |
| Dec. 14, 1972 [GB] | United Kingdom | 57874/72 |
| Feb. 13, 1973 [GB] | United Kingdom | 6892/73 |

[51] Int. Cl.$^2$ ............................................. C01B 17/04
[52] U.S. Cl. ................................. 423/226; 423/236; 423/573 R
[58] Field of Search .............. 423/233, 236, 560, 561, 423/571, 573, 226; 260/370

[56] References Cited

U.S. PATENT DOCUMENTS

| 1,636,106 | 7/1927 | Naef | 423/560 |
| 1,971,779 | 8/1934 | Gollmar | 423/571 |
| 3,558,272 | 1/1971 | Urban | 423/571 |
| 3,642,448 | 1/1971 | Beavon | 423/560 X |
| 3,887,682 | 6/1975 | Kumata et al. | 423/236 |

OTHER PUBLICATIONS

Mellor, J. W., "A Comprehensive Treatise on Inorganic and Theoretical Chemistry", Longmans, Green & Co.; Lond, 1940, vol. X, p. 494.
Sneed et al., "Comprehensive Inorganic Chemistry", vol. 6, D. Van Nostrand Co.; N. Y. 1957, p. 167.

*Primary Examiner*—G. O. Peters
*Attorney, Agent, or Firm*—Larson, Taylor and Hinds

[57] ABSTRACT

Thiosulphate ions present in gas purification liquors, particularly those employed for removing $H_2S$ by washing with aqueous alkaline solutions of vanadium compounds and anthraquinone disulphonic acids, are decomposed to sulphide and hydroxyl ions by exposing the liquor to a hydrogen rich gas at elevated temperature e.g., 650° C. The liquor may be evaporated and the solid residue subjected to decomposition. Any thiocyanate ions are hydrolyzed; it being necessary to mix steam with the hydrogen rich gas if a solid residue is being decomposed.

16 Claims, No Drawings

GAS PURIFICATION LIQUORS

This is a continuation of application Ser. No. 667,212 filed Mar. 15, 1976 which in turn is a continuation of Ser. No. 414,275 filed Nov. 9, 1973 both abandoned.

BACKGROUND OF INVENTION

This invention relates to a method of treatment of gas purification plant washing liquor, effluent liquor or other liquor so as to remove therefrom sodium thiosulphate.

It is known from, for example, our British patent specification No. 948,270 to practice removal of hydrogen sulphide from fuel gases by washing the latter with an aqueous alkaline solution of anthraquinone disulphonic acid and inter alia an alkali metal vanadate. The principal, and desired, chemical reaction occurring is the aerial oxidation of hydrogen sulphide to elemental sulphur catalyzed by the two active ingredients of the solution:

$$H_2S + \tfrac{1}{2}O_2 \rightarrow H_2O + S \tag{1}$$

However, some side reaction oxidation of hydrogen sulphide to thiosulphate ion occurs to an extent depending on such factors as the solution pH, solution temperature and the oxygen content of the gas to be purified.

$$\text{e.g., } 2HS^- + 2O_2 \rightarrow S_2O_3^= + 4H^+ \tag{2}$$

Such side reaction oxidation is an undesirable feature of the process for several reasons, amongst which is the fact that, ultimately, the thiosulphate content of the washing liquor reaches a level at which "salting-out" losses of the active chemical ingredients, anthraquinone disulphonic acid and vanadate, is likely to occur, necessitating expensive make-up with these chemicals. Since, therefore, some thiosulphate formation is inevitable it is necessary to employ a means of removal of this compound from the wash liquor, allowing of the return of the latter to the purification plant.

It is also common practice, in the Stretford and similar processes, to recover elemental sulphur from the system by heating a sulphur slurry, derived by froth-flotation, from the main circulating liquor, in an autoclave heated to a sufficiently high temperature to cause fusion of the sulphur which may then be run off from the autoclave base. Unfortunately, the hot alkaline liquor causes a sulphur solubilization, additional to that produced by the mechanism discussed earlier, represented by the equation:

$$2S + 6OH^- \rightarrow S_2O_3^= + 3H_2O \tag{3}$$

Thus the treated aqueous product from the autoclave contains particularly high quantities of sodium thiosulphate.

There are thus two effluent streams from a Stretford Process plant, both containing the relatively expensive anthraquinone disulphonic acid and an alkali metal vanadate, from which it is advantageous to remove sodium thiosulphate allowing for the re-use of the streams.

The process according to the invention meets this requirement and consists essentially of exposing the liquor to be treated, or a solid-residue derived therefrom by evaporation, to a hydrogen-rich gas at an elevated temperature.

In accordance with the present invention there is provided a process for the decomposition of thiosulphate ions present in aqueous gas purification liquors to sulphide and hydroxyl ions which process comprises exposing said liquor, or a solid residue derived therefrom by evaporation, to a hydrogen-rich gas at elevated temperature.

The invention also provides a process for the absorption and subsequent removal as sulphur of hydrogen sulphide from gases, gas mixture and liquid hydrocarbons, in which the material containing hydrogen sulphide is washed with an aqueous alkaline solution containing one or more anthraquinone disulphonic acids, a compound of a metal having at least two valency states, and if necessary a chelating or sequestering agent for retaining such metal compounds in solution, removing sulphur from the aqueous wash solution by froth flotation and subjecting the thus formed sulphur containing froth and/or at least part of the liquor from which the sulphur has been removed to a decomposition process as described herein.

The temperature at which the decomposition may be carried out ranges from 500° to 800° C, preferably from 600° to 650° C.

The hydrogen-containing gas may be town's gas, the reducing atmosphere existing in a flame burning with a reduced oxygen or air supply, or gaseous products obtained by the partial combustion of a hydrocarbon fuel, such as tar or heavy fuel oil.

DESCRIPTION OF PREFERRED EMBODIMENTS

The process chemistry appears to be complex and laboratory experiments consisting of passing hydrogen gas over heated sodium thiosulphate in a tubular electric furnace have shown that decomposition occurs with the liberation of gaseous hydrogen sulphide, leaving a residue consisting of a mixture of sodium sulphide and sodium hydroxide. The gaseous hydrogen sulphide is transferred to a Stretford Process plant, where conversion to elemental sulphur takes place; the sodium sulphide/sodium hydroxide residue is acceptable, in any proportion, to the bulk of the Stretford Process liquor, where conversion to sulphur and sodium carbonate, respectively, takes place.

$$4NaVO_3 + 2Na_2S + 3H_2O \rightarrow Na_2V_4O_9 + 2S + 6NaOH \tag{4}$$

and $$NaOH + NaHCO_3 \rightarrow Na_2CO_3 + H_2O$$

Frequently, a Stretford Process liquor, or other gas purification plant liquor will contain both sodium thiosulphate and sodium thiocyanate as undesirable constituents. This is particularly the case where the gas stream to be purified contains hydrogen cyanide, in which case accumulation of sodium thiocyanate occurs in the wash liquor. The present invention is particularly appropriate where simultaneous removal of sodium thiocyanate and sodium thiosulphate is required. The two salts may be considered to react separately; sodium thiocyanate with steam and sodium thiosulphate with hydrogen, when the liquor to be treated, or a solid derived therefrom is exposed to a steam/hydrogen mixture at an elevated temperature.

According to one embodiment of the invention the decomposition may be achieved by injection of the aqueous solution from which removal of sodium thiosulphate is required, via a spray nozzle into a reducing flame at a temperature of 500°-700° C; reducing flame conditions are achieved by operating the burner with considerably less air than the stoichiometric requirement; the hydrogen partial pressure thus obtained may be increased if necessary by introduction of a hydrogen-rich gas into the system, mixing with the combustion products from the burner.

In a second embodiment the process may be effected by initially evaporating the aqueous solution to be treated in a crystallizer or obtaining a solid residue by spray drying; the solid residue may then be transferred to a rotary kiln through which a hydrogen rich gas, e.g., town's gas is passed. The temperature at which the reaction is carried out is preferably 300°-800° C, most preferably 650° C. The product gases from the kiln are colled by heat exchange with the incoming town's gas feed to the kiln and subsequently dissolved product hydrogen sulphide is stripped from the condensate by passage of an inert gas through the condensate in a stripper tower. The hydrogen sulphide thus removed from solution may conveniently be converted to sulphur by washing in a Stretford Process absorption tower, after which the purified inert gas may be recycled to the base of the stripper tower. A solid residue which contains solium hydroxide, sodium sulphide or a mixture or both is discharged from the kiln via a sealing hopper; the town's gas feed to a kiln is superheated, prior to the kiln, after heat exchange with the product gases. The solid residue may be returned to the main circulating liquor of the Stretford Plant without further treatment.

In those cases where it is desired to remove thiocyanate in addition to thiosulphate an aqueous solution of the Stretford liquor containing sodium thiocyanate and sodium thiosulphate may be injected into a reducing flame at a temperature in the range of 500°-700° C. Hydrogen sulphide is evolved and may be treated as previously described; the solid residue containing sodium hydroxide and sodium sulphide (derived from decomposed sodium thiosulphate), sodium carbonate (derived from decomposed sodium thiocyanate) together with sodium vanadate may be recovered and returned to the Stretford Process plant. Alternatively, the solution containing the mixed salts may be treated by prior evaporation in a crystalliser followed by treatment of the solid residue in a rotary kiln through which a mixture of superheated steam and hydrogen is passed at a temperature of 500°-700° C.

According to a third embodiment of the invention, the liquor may be treated by heating the residue, obtained by evaporation of the liquor, in a rotary kiln, heated by combustion of a hydrocarbon under controlled aeration conditions so as to produce carbon monoxide and hydrogen with an overall heat evolution sufficient to maintain the temperature of the kiln at least 800° C, and leaching water-soluble compounds including vanadate salts from the residue remaining after the heat treatment. The admission superheated steam to the kiln is necessary if sodium thiocyanate is present.

It is, of course, possible to supply carbon monoxide necessary for the reaction in the gaseous form, e.g., producer gas, water gas or blast-furnace gas.

In a preferred form of this embodiment the liquor to be treated is evaporated to give a residue which, together with the hydrocarbon is passed to the rotary kiln. Combustion of the hydrocarbon occurs within the kiln, combustion air being admitted in a controlled manner so as to achieve a partial combustion only of the fuel. This combustion process produces the reducing atmosphere via reactions of the type $$C_nH_{2n+2} + \tfrac{n}{2} O_2 \rightarrow nCO + (n + 1) H_2$$

where $C_nH_{2n+2}$ represents the paraffin hydrocarbon fuel.

The carbon monoxide and hydrogen thus produced decompose the sodium thiosulphate and sodium sulphate by a reduction process converting these salts to sodium sulphide. If sodium thiocyanate is present it is necessary to admit superheated steam to the kiln in order to achieve decomposition of the sodium thiocyanate to sodium carbonate. The overall heat input to the kiln is made sufficient to maintain the temperature of the kiln at at least 800° C. The partial combustion of hydrocarbon fuel leaves a carbonaceous residue admixed with the decomposed products of the sodium salts. The product from the kiln may be leached with water so as to extract the sodium sulphide and sodium carbonate products together with the sodium vanadate originally present in the process liquor leaving carbonaceous compound as an insoluble residue. The mixture containing sodium sulphide and sodium carbonate may be added to the Stretford process liquor in any proportions. We have also found it to be possible to achieve the decomposition by passing hydrogen (if decomposition of thiosulphate along is required) or a mixture of steam and hydrogen (if decomposition of thiosulphate and thiocyanate is required) through an indirectly heated tube containing the appropriate solid residue obtained by evaporation of the liquor to be treated. If the ratio of thiocyanate to thiosulphate is high, the desired result may be achieved with little or no added hydrogen, since hydrogen may be formed in situ during the hydrolysis of the thiocyanate, viz;

$$2NaCNS + 5H_2O \rightarrow Na_2CO_3 + CO_2 + 2H_2S + N_2 + 3H_2$$

This hydrolysis reaction may conveniently be carried out by injection of an aqueous thiocyanate solution into a hot reaction chamber at a temperature in excess of 600° C. This reaction chamber could be directly or indirectly heated in as much as the heat source could be a direct flame into which the thiocyanate solution is sprayed or a radiant tube heater or the like, where the thiocyanate solution does not directly contact the hot combustion gases. The process may also be effected by initially evaporating an aqueous solution of sodium thiocyanate in a crystallizer; the thiocyanate crystals are then transferred to a rotary kiln through which superheated steam is passed. This vessel is maintained at a temperature not less than 600° C. The outlet steam is colled by exchanging heat to the incoming steam feed to the kiln and subsequently, dissolved product hydrogen sulphide is stripped from the condensate by passage of an inert gas through the condensate in a stripper tower. The hydrogen sulphide thus removed from solution may conveniently be converted to sulphur by washing in a Stretford process absorption tower, after which the purified inert gas stream may be recycled to the base of the stripper tower. Sodium carbonate is discharged from the kiln via a sealing hopper; the steam feed to the kiln is superheated, prior to the kiln, after heat exchange from the product gases.

In the decomposition processes described, the organic reagent, sodium salt of anthraquinone disulphonic acid, is lost by pyrolysis in the reaction chamber. We have found that it is possible to recover a substantial proportion of this anthraquinone disulphonic acid by interposing during the concentration step a cooling and filtration operation which results in crystallisation and recovery of approximately 78% of the anthraquinone disulphonic acid. Thus, if the solution containing the usual Stretford Re-agents including 3 grams/liter and 350 Grams/liter of anthraquinone disulphonic acid salt and thiosulphate by-product respectively is concentrated to give approximately 70% s/v of these dissolved salts and then held at 30° C, 78% of the anthraquinone disulphonic acid crystallizes out with a very small proportion of sodium sulphate, and can be recovered by filtration the thiosulphate remaining in the liquor. It is possible, of course, to operate at various other advantageous concentrations and mixtures so as to vary the recovery of this valuable re-agent.

The invention will be illustrated by the following example:

Hydrogen gas was saturated with water at 80° C.

The Hydrogen/water vapor mixture was passed over 1 gm. of sodium thiocyanate in a tubular reactor maintained at 650° C, at a rate of 2 cubic ft/hr of 1.5 hours.

Analysis of residue showed that 42% of the sulphur content had been removed as hydrogen sulphide gas. The sulphur content remaining in the residue had the following analysis.

Sulphite — 4.1%
Sulphide — 95%
Sulphate — 0%
Thiosulphate — 0%

Although the main reduction reaction proceeded according to the equation.

$$Na_2S_2O_3 + 4H_2 \rightarrow Na_2S + 3H_2O + H_2S.$$

Some sulphite was produced according to the side reaction:

$$Na_2S_2O_3 + H_2 \rightarrow Na_2SO_3 + H_2S.$$

What is claimed is:

1. A process for the decomposition of thiosulphate ions present in aqueous gas purification liquors employed for removing hydrogen sulphide from fuel gases or liquid hydrocarbons by means of a wash liquor containing vanadium compounds and sodium anthraquinone disulphonate, concentrating and cooling said liquors so as to crystallize out the sodium anthraquinone disulphonate, recovering the sodium anthraquinone disulphonate and exposing the resulting liquor or a solid residue derived therefrom by evaporation to a hydrogen-rich gas at a temperature of 300° to 800° C in the absence of a catalyst.

2. A process as claimed in claim 1 in which thiocyanate ions are also present in the liquor, and a solid residue derived from said liquor is exposed to a mixture of hydrogen rich gas and steam.

3. A process as claimed in claim 1 in which the decomposition is carried out at a temperature of from 500° to 800° C.

4. A process as claimed in claim 1 in which said aqueous liquor is sprayed into a reducing flame at a temperature of from 500°–700° C, said reducing flame conditions being achieved by burning in hydrocarbon fuel with less than the stoichiometric requirement of air.

5. A process as claimed in claim 3 in which additional hydrogen rich gas is admitted with the combustion product obtained by the incomplete combustion of a hydrocarbon fuel.

6. A process as claimed in claim 1 in which a solid residue derived by the evaporation of said liquor is contacted with a hydrogen rich gas in a rotary kiln, at a temperature of from 300° to 800° C.

7. A process as claimed in claim 6 in which the decomposition is carried out at a temperature of 650° C.

8. A process as claimed in claim 1 in which a solid residue derived by the evaporation of said liquor is contacted with a mixture of hydrogen rich gas and steam in a rotary kiln at a temperature of from 500°–700° C.

9. A process as claimed in claim 1 in which said hydrogen rich gas is Town's Gas.

10. A process as claimed in claim 1 in which a solid residue derived from the evaporation of said liquor, is contacted with product of the incomplete combustion of a hydrocarbon fuel with air, at a temperature of at least 800° C in a rotary kiln.

11. A process as claimed in claim 10 in which superheated steam is admitted to the kiln.

12. A process as claimed in claim 10 in which the hydrocarbon fuel is tar or heavy fuel oil.

13. A process as claimed in claim 1 in which the solid residue obtained after decomposition is leached with water and the water-soluble fraction is returned to the wash liquor.

14. A process as claimed in claim 1 in which an aqueous liquor containing both thiosulphate and thiocyanate ions is decomposed by injection into a reaction chamber maintained at a temperature of at least 600° C, said hydrogen rich gas being produced in situ by hydrolysis of the thiocyanate.

15. A process as claimed in claim 1 in which a solid residue derived by evaporation of a liquor containing both thiosulphate and thiocyanate ions is decomposed by contact, in a rotary kiln maintained at a temperature of at least 800° C with superheated steam, said hydrogen-rich gas being produced in situ by hydrolysis of the thiocyanate.

16. In a process for the absorption and subsequent removal as sulphur of hydrogen sulphide from gases, gas mixtures and liquid hydrocarbons, in which the material-containing hydrogen sulphide is washed with an aqueous alkaline solution containing one or more anthraquinone disulphonic acids, in compound of a metal having at least two valency states, and if necessary a chelating or sequestering agent for retaining such metal compounds in solution, removing sulphur from the aqueous wash solution by froth flotation the improvement consisting in subjecting the thus formed sulphur containing froth and/or at least part of the liquor from which the sulphur has been removed to a decomposition process as claimed in claim 1.

* * * * *